United States Patent [19]

Dorka

[11] Patent Number: 5,456,047
[45] Date of Patent: Oct. 10, 1995

[54] FRICTION DEVICE FOR PROTECTION OF STRUCTURAL SYSTEMS AGAINST DYNAMIC ACTIONS

[76] Inventor: Uwe Dorka, Badstr. 2-67677, Enkenbach-Alsenborn, Germany

[21] Appl. No.: 194,558

[22] Filed: Feb. 10, 1994

[30] Foreign Application Priority Data

Feb. 19, 1993 [DE] Germany .................. 43 05 132.4

[51] Int. Cl.$^6$ .................................................. E04B 1/98
[52] U.S. Cl. .................. 52/167.4; 52/167.1; 52/167.6; 52/167.8; 248/638; 248/568; 248/636
[58] Field of Search .................. 52/167.4–167.9, 52/167.1; 248/638, 568, 569, 602, 632, 634, 636

[56] References Cited

U.S. PATENT DOCUMENTS

| | | | |
|---|---|---|---|
| 2,014,643 | 9/1935 | Bakker | 52/167.5 X |
| 2,660,386 | 11/1953 | Munro | 248/638 X |
| 2,660,387 | 11/1953 | Roy | 248/638 X |
| 4,121,393 | 10/1978 | Renault et al. | 52/167.9 X |
| 4,499,694 | 2/1985 | Buckle et al. | 52/167.7 |
| 4,633,628 | 1/1987 | Mostaghel | 52/167.9 X |

FOREIGN PATENT DOCUMENTS

| | | |
|---|---|---|
| 0349979 | 1/1990 | European Pat. Off. . |
| 3402449 | 4/1986 | Germany . |
| 3414706 | 8/1988 | Germany . |

*Primary Examiner*—Carl D. Friedman
*Assistant Examiner*—Robert J. Canfield
*Attorney, Agent, or Firm*—Felfe & Lynch

[57] ABSTRACT

A friction damper that is able to reduce vibrational motions in two dimensions, can be re-used, is easily adjustable and has an extremely smooth transition between sticking and sliding in particular. The friction damper features a stack of at least two friction discs and a prestressing device for this stack. Touching each other at curved contact surfaces, these friction discs are alternately joined with the first and second of two friction damper connections, respectively. The curved contact surfaces can be provided in a simple manner either by an alternate arrangement of lense-shaped and plane friction rings or by alternate arrangement of plane friction rings with convex inserts and plane friction rings.

11 Claims, 4 Drawing Sheets

FRICTION DEVICE FOR PROTECTION OF STRUCTURAL SYSTEMS AGAINST DYNAMIC ACTIONS

TECHNICAL FIELD

This invention relates, generally, to the protection of structural systems against dynamic loading like wind, earthquakes or traffic induced vibrations. It is particularly useful in so-called Response Control Systems for earthquake protection.

BACKGROUND ART

Response Control Systems are constructed such that, with the help of special devices, an as large as possible part of the earthquake's energy is prevented from inducing stresses as potential energy in the system. By the layout of the behavior of these devices, their position in the system and the structure of the remaining system tuned accordingly, the whole system becomes a mechanism reacting in a controlled manner to a strong motion earthquake and therefore is not a "static" system in its pure sense anymore.

This mechanism can be designed such that it limits the stresses in the system to a defined level. This safely protects the structure from damage. Such a limit can be achieved by implementing friction dampers that do not transfer more than the adjusted friction force to the structural system.

There is a distinction between passive, active and hybrid Response Control Systems.

To function, active systems need external energy. For earthquake protection of buildings, active systems are not suitable in most cases because the required machinery and energy approaches magnitudes that are often not realistic. They have been implemented successfully though, in high-rise buildings to control wind induced vibrations.

On the other hand, passive systems have proven their effectiveness for earthquake protection and have been implemented successfully several times in different countries, notably in Japan. Especially worth noting are several Base Isolation Systems, although they are limited to buildings of no more than approximately 10 stories. Furthermore, the Hyde Systems should be noted which have been successfully implemented in high-rises with more than 30 stories and also in low-rise buildings. These are systems where hysteretic devices are exclusively used for response control.

So far, hybrid systems have no practical application but they are promising with respect to improving the effect of passive systems in case of an earthquake.

Dampers play an important role in the above mentioned Response Control Systems, may they be active, passive or hybrid. Dampers can be distinguished by their effective mechanism like friction, plasticity, viscosity, magnetism or mass inertia. Depending on their design, they allow unidirectional, bi-directional or tri-directional action. Important criteria for a damper are accuracy and stability of its hysteresis under limit load, service life, maintainability, adaptability to various applications and implementation requirements.

For retrofitting buildings that are vulnerable to earthquakes, Base Isolation and Hyde Systems are particularly useful. Base Isolation is suited for protection of historic buildings where the structural material and construction cannot be altered because of its historic importance. Furthermore, the Base Isolation System is essentially invisible underneath the buildings after completion.

Hyde Systems are suited for retrofitting of many steel and reinforced concrete structures built in the sixties and seventies that are vulnerable to earthquakes because of then insufficient code requirements.

Friction dampers that can be used in such systems are for example known from the European patent application no. 0349979. The friction damper described there is a friction-spring element that is made of outer rings and axially slotted inner rings acting together via conical contact surfaces. The rings are arranged inside a casing which consists of two telescoping parts. Each of these parts has a spherical rod end bearing attached to its free end. The prestressing of the friction-spring element is accomplished by a central bolt within the casing.

This friction-spring element is only effective in one direction and has an irregular transition from sticking to sliding. Furthermore, the adjustment of the prestressing is inaccurate and the adjustment bolt is difficult to reach.

From the German patent no. 3402449, a device to dampen vibrations in tower-like structures is known. It consists of a pendulum which is suspended with one end from a cantilever attached to the building and loosely enters with the other end through an opening at the top of a void in a friction weight. The friction weight comprises a stack of several un-bonded circular shaped disc-like friction plates with outer diameters increasing from top plate to bottom plate. The dimensioning of the friction plates should be performed in such a way that the damping effect of the stacked friction plates increases with respect to a particular pendulum displacement and the layout of the device is simplified. This allows the damping device to react already at small building motions since with growing pendulum amplitude, more and more friction plates are activated.

Another damper is known from the German patent no. 3414706 which acts like a tuned mass damper with a gradually increasing damping effect after the building reaches a certain amplitude of vibration. For this purpose, the damper consists of one or several friction objects with convex friction surfaces. Each friction object is fixed to the top of an essentially vertical elastic cantilever column which is attached to the building. One friction disc with concave friction surfaces is located at a certain distance over each friction object in the at-rest condition and joined with one damper mass. Each damper mass is attached to a separate pendulum suspended from a cantilever which is fixed to the building. Each friction disc has a circular asperity centered over the at-rest position of the friction object belonging thereto. When the pendulum exceeds a certain amplitude, the friction object slides along the concave friction surface of the friction disc and its circular asperity. Because of this layout, a friction force does not occur around the center position of the damping device and the damper mass can respond already to small vibrations.

From the two documents mentioned above, friction dampers with friction discs or the use of convex friction discs are known as single features.

Considering this state of the art, it is an object of this invention to provide a friction damper that is able to dampen vibrations in two dimensions, can be re-used, is easily adjustable in a wide range even when implemented and has a very smooth transition from sticking to sliding in particular to prevent the stick-slip motion present in known friction dampers.

Furthermore, it is an object of this invention to provide a maintenance-friendly damper with a very high adjustment accuracy.

SUMMARY OF THE INVENTION

The invention is based on the idea that friction discs, arranged in a stack and movable against each other, touch each other only at curved contact surfaces. The curvature of the contact surface has the effect that the pressure is zero at the rim of the contact area and grows to its maximum at its center. This allows the local frictional resistance at the rim of the contact area to be overcome already by a small tangential loading on the stack. With increasing load, the part of the contact area that has to carry the additional tangential force decreases continually until gross slip occurs between the friction discs. In the same manner, the tangential stiffness of the stack therefore reduces to zero and the friction force grows to its maximum. In a simple and secure way, this behavior removes the irregular transition from sticking to sliding, the so called stick-slip effect, which is a disadvantage of the known friction dampers. In case gross slip does not occur which means that the friction discs do not slip against each other, energy is nevertheless dissipated at lower load levels in the outer regions of the contact area where the local frictional resistance has been overcome.

The object of the invention is achieved in particular by a friction damper that includes a stack of at least two friction discs touching each other at curved contact areas and being alternately joined with the first and second of two friction damper connections, and a prestressing device for the stack of friction discs.

The tangential force necessary to produce gross slip in the stack can be influenced in a wide range by either the prestressing force in the stack or the number, surface properties and material of the friction discs. The size of the contact areas is a measure of the stack's tangential stiffness and is determined by the surface curvature and the prestressing force between the friction discs. The prestressing device for the stack of friction discs provides the desired prestressing force. The friction discs are preferably made of metal, ceramic or metal combined with ceramic.

The connection between the friction discs and the friction damper connections can be provided in a simple manner, if the stack of friction discs consists of alternately arranged rings with larger and smaller outer and inner diameters.

The rings with the smaller outer and inner diameter are then pulled over a guide tube attached to the first friction damper connection and the rings with the larger outer and inner diameter are ensleeved by a mantle tube attached to the second friction damper connection. Both damper connections are preferably designed as flanges and made of metal.

To create the contact areas, various designs with curved contact surfaces are possible whereby it is essential that the curvature of the contact areas produces a pressure distribution that decreases towards their rims.

A very simple way of achieving this is an alternate arrangement of toroidal friction rings having a lense-shaped cross section and plane friction rings where the lense-shaped rings produce the desired behavior described above by virtue of their curvature.

Another possibility to design the contact areas that is not limited to friction rings but is suitable for friction discs in general, is an alternate arrangement of plane friction discs with convex, preferably round inserts and plane friction discs. The convex inserts provide the desired pressure distribution. Preferably, they are round with diameters of 10 mm to 50 mm and are made of ceramic.

Because there are several contact areas between neighboring friction discs with the insert solution, the influence of inaccuracies in the friction discs' curvature and of the variation in the frictional coefficients on the tangential force in the damper is smaller. By increasing the number of friction discs, the tangential force necessary to be transmitted by each insert is reduced allowing for a reduction in prestressing force on the stack of friction discs. This increases the service life of the damper.

The maximum frictional displacement possible is given by the clearance between the rings with larger outer and inner diameter and the inner guide tube and the clearance between the rings with smaller outer and inner diameter and the mantle tube. The maximum frictional displacements can be individually adjusted for different tangential directions by the shape of the friction discs' rim and/or by the shape of the inner guide tube and/or outer mantle tube, if for example a smaller frictional displacement must be possible in a particular direction of a building. That way, the maximum frictional displacements possible for various tangential directions can be changed up to a total prevention of friction.

Especially suitable as a prestressing device for the stack of friction rings is a tightening bolt with its shank extending through the guide tube and holding a tightening plate at the free end of the guide tube that presses the friction discs against the first friction damper connection.

The guide tube prevents shear forces on the bolt's shank when the maximum possible frictional displacement is reached in any direction. This secures the necessary prestressing force in case of occasional exploitation of the maximum possible displacements which is equivalent to an exceedance of the design limit state of the structure.

A single disc spring with non-linear elastic spring characteristic or a package of them placed between the tightening bolt's head and the first friction damper connection allows a very precise adjustment of the prestressing in the bolt through the measurement of the disc spring's or disc spring package's deformation. This also provides a simple way of controlling the prestressing later after implementation. Furthermore, this type of disc springs compensates later possible settlements in the stack of friction discs almost completely and allows an adjustment accuracy of the prestressing force of the friction damper of about ±2% around a required value.

The application of the friction damper is not limited to earthquake protection of buildings but extends to other fields of vibration protection, e.g. vibration isolation of machine foundations or the damping of wind induced vibrations.

BEST MODES FOR CARRYING OUT THE INVENTION

Figure 1:
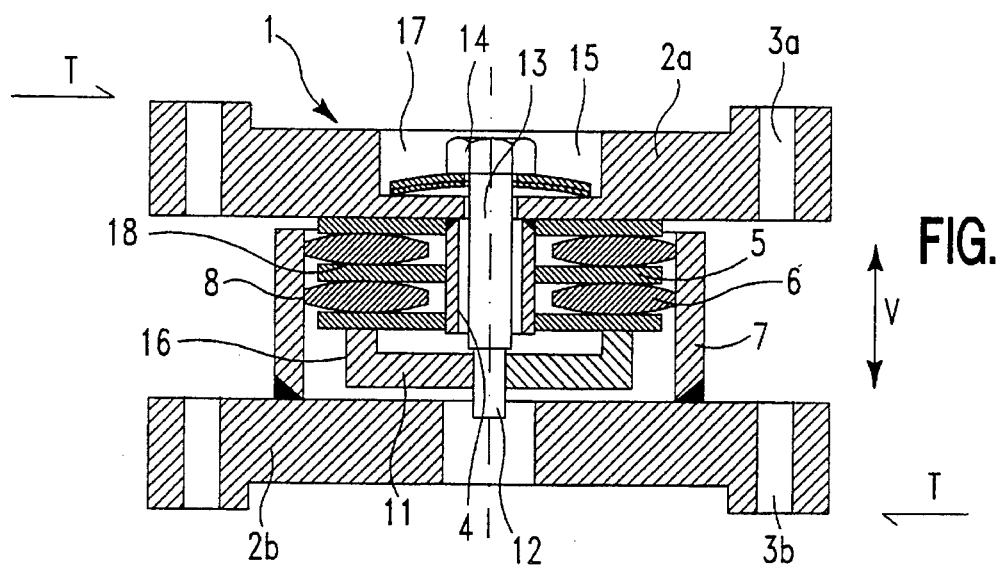
FIG. 1 is a section of a first friction damper with toroidal friction rings having a lens-shaped cross section.
Figure 2:
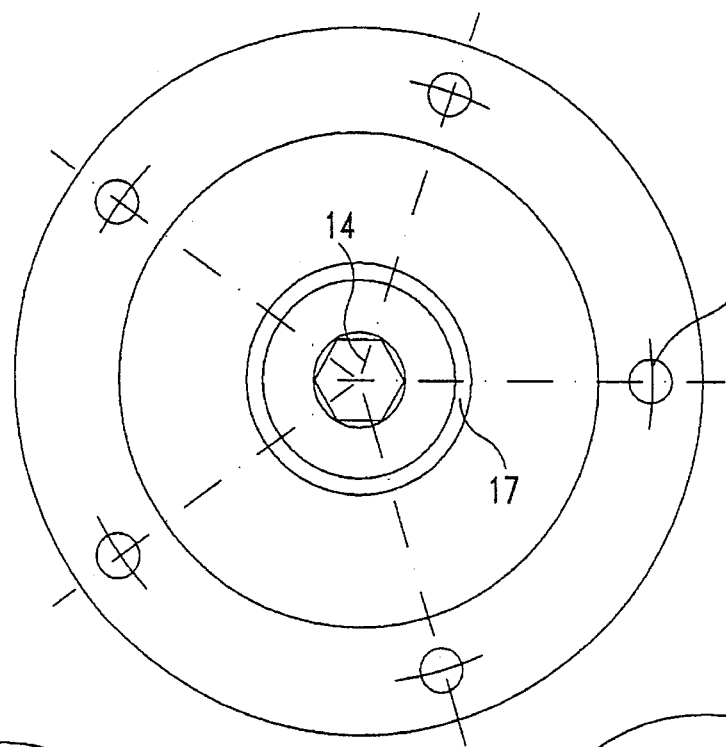
FIG. 2 is a plan view of a friction damper shown in FIG. 1.

The friction damper, denoted by the reference numeral 1 as a whole in FIG. 1, has two flanges denoted 2a and 2b that can be connected via their connection bore holes 3a and 3b under any angle to a structure that is to be damped, for example the flange 2a underneath a reinforced concrete slab not shown in the figure and flange 2b on top of a wall or column, also not shown in the figure. A guide tube 4 is centered and attached to flange 2a providing the connection between planar friction rings 5 and flange 2a and a mantle tube 7 is centered and attached to flange 2b providing the connection between toroidal friction rings 6 having a lense-shaped cross section, hereinafter lense-shaped friction rings, and flange 2b.

Because the outer rim 8 of the lense-shaped friction rings 6 can move along the inner face of the mantle tube 7, the flanges 2a and 2b can move freely against each other in the direction denoted V in FIG. 1.

The tangential forces denoted T in FIG. 1 and acting on the flanges 2a and 2b of the friction damper 1 are carried by the prestressed stack of friction rings which is made of planar friction rings 5 and lense-shaped friction rings 6.

The thread 12 of a tightening bolt 13 which extends through the guide tube 4 and is indirectly supported via a disc spring package 15 by flange 2b, ends in a tightening plate 11 which is pressed with its rim 16 against the lower most planar friction ring 5 of the stack of friction rings.

By turning the head of bolt 14 accordingly, the prestressing force on the stack of friction rings can be precisely adjusted. A maximum friction force is produced in the stack of friction rings acting in a tangential direction to the flanges 2a and 2b. This friction force depends on the number of lense-shaped friction rings and the coefficient of friction between friction rings 5, 6 and can be easily adjusted and re-adjusted even when the damper is implemented by turning the head 14 of the tightening bolt 13.

In the sample version of the damper, the disc spring package 15 consists of 2 disc springs with non-linear elastic spring characteristic which can be tuned according to each application's demand. This disc spring package rests on the surface of flange 2a in a circular indentation 17. By measuring the deformation of this disc spring package, the prestressing in the tightening bolt 13 and therefore in the stack of friction rings can be controlled precisely. Furthermore, the disk spring package compensates later possible settlements in the stack of friction rings almost completely.

According to the invention and as already explained above in detail, the friction rings, here lense-shaped friction rings 6 and planar friction rings 5, only touch each other in contact areas 18.

By the surface curvature 19 of the lense-shaped friction rings 6, the size of the contact area between friction rings 5, 6 can be influenced. The initial stiffness of the friction damper's force-displacement curve, an example of which is given in FIG. 8, depends on the size of these contact areas.

Figure 8A:
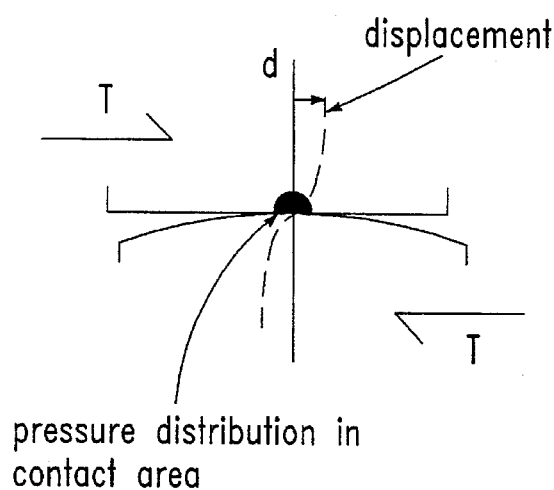
FIG. 8(a) illustrates the pressure distribution in a section of the contact area between two friction discs.
Figure 8B:
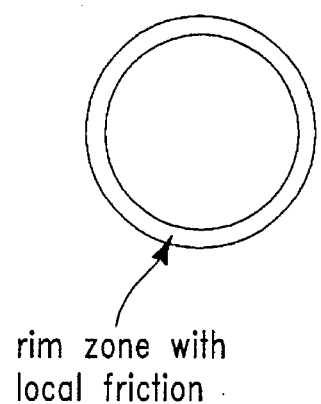
FIG. 8(b) is an enlarged plan view of a circular contact area with an annulus of local friction at its rim.
Figure 8C:
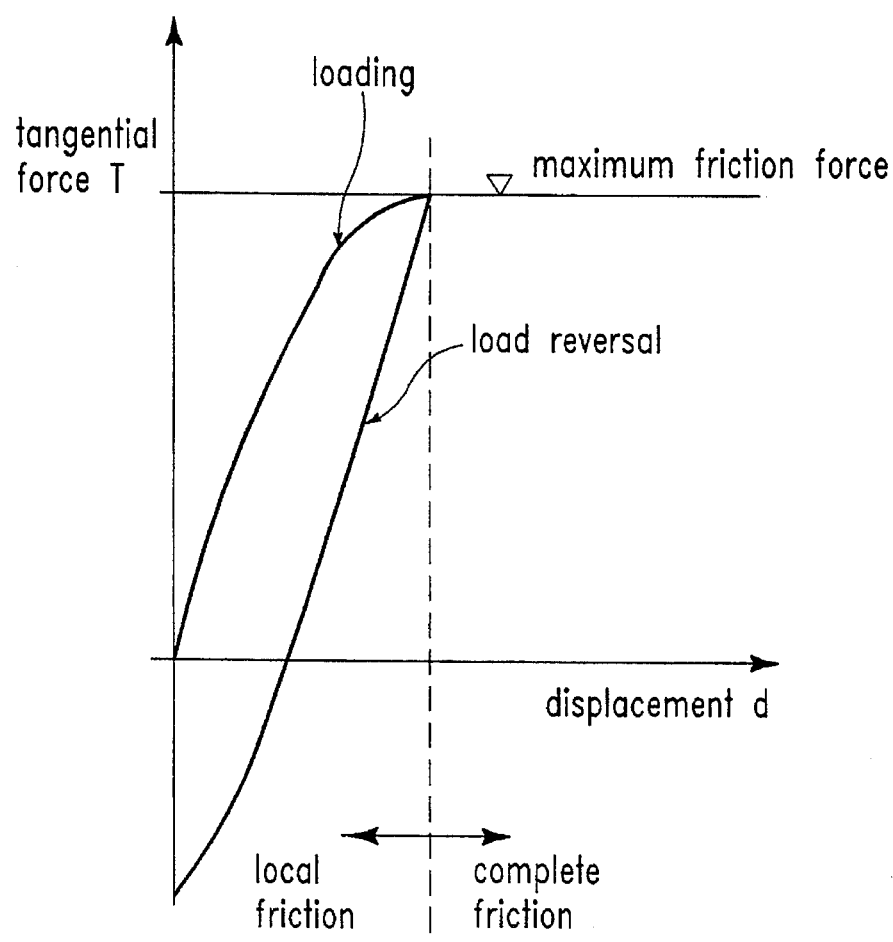
FIG. 8(c) is force vs. displacement curve for the friction damper.

Because the pressure distribution given in FIG. 8(a) is =0 at the rim of the contact area and rises to a maximum at its center, friction occurs at the rim of the contact area already under small tangential forces acting on flanges 2a and 2b. This results in a continuous decrease in stiffness of the friction damper—to zero in case of gross friction—and in energy dissipation already for low load levels without gross slip between the friction discs as is evident from the force-displacement curve in FIG. 8(c) (region "friction in rim zone"). The un-desirable jump between sticking and sliding, present in existing friction dampers, does not occur in the said friction damper because of the continuous transition from sticking to sliding. The friction damper can therefore be successfully applied also for low load levels where no gross slip occurs.

The maximum frictional displacement of the friction damper 1 results from the clearance between the lense-shaped friction rings 6 and guide tube 4 and the planar friction rings 5 and mantle tube 7.

By adjusting the shape of the mantle tube 7, the rims of the friction rings 5,6 and the shape of the guide tube 4, different maximum possible frictional displacements can be produced in different directions with one damper. The limit on possible frictional displacements provides an additional margin of safety in case of an unexpectedly large earthquake because after the limit of the damper is reached which coincides with exceeding of the structure's design limit, the building is stabilized additionally by the overload potential of the damper without damaging the damper instantly.

As is seen from FIG. 1, the guide tube 4 prevents the shank of the prestressing bolt 13 from receiving shear forces when the maximum possible frictional displacement is reached. This ensures that the prestressing is not lost after such an event and the complete functionality of the damper is preserved.

Figure 4:
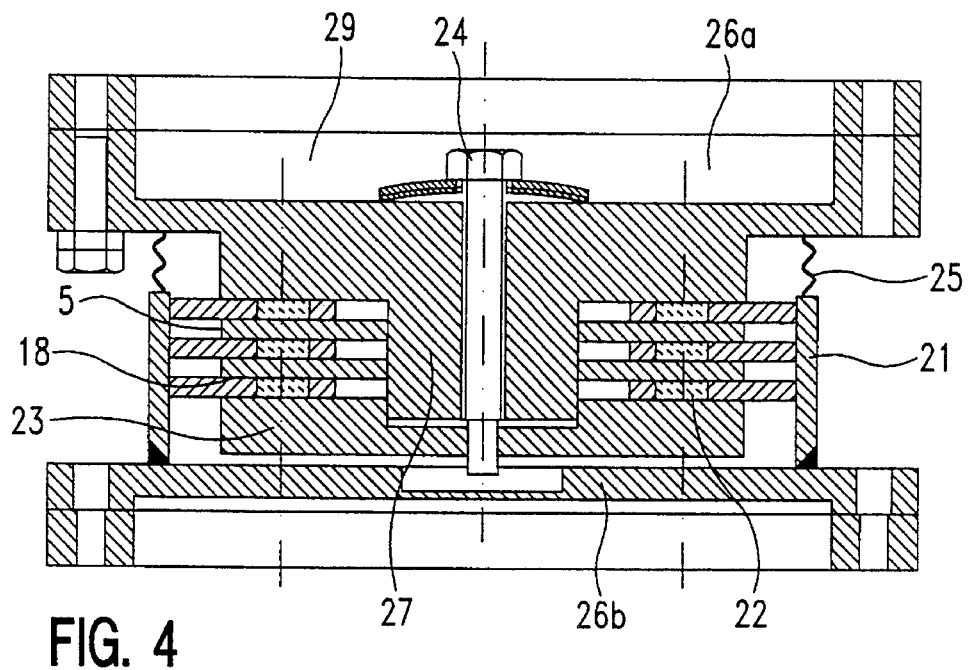
FIG. 4 is a section of a second friction damper with friction discs containing inserts.
Figure 5:
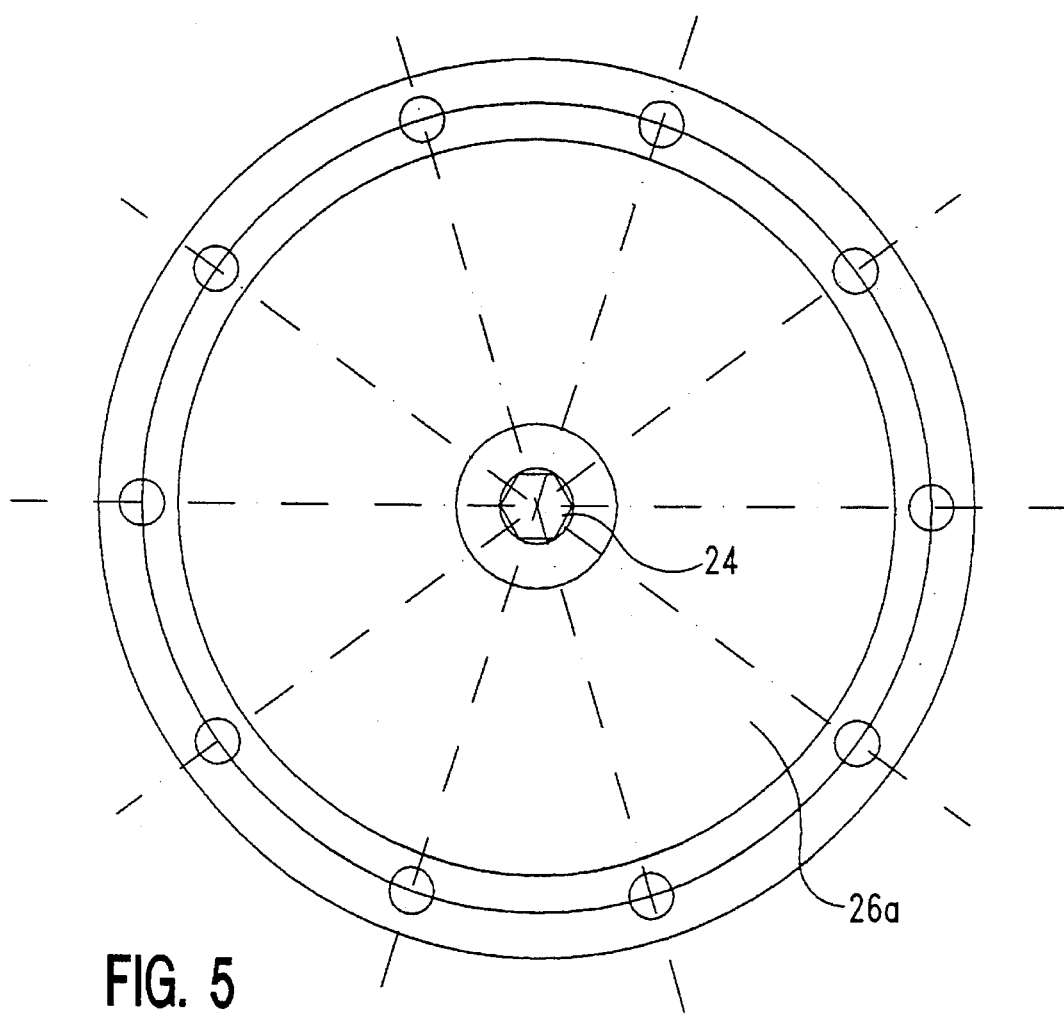
FIG. 5 is a plan view of the friction damper shown in FIG. 4.

FIG. 4 shows another sample version of the friction damper with a structure essentially coinciding with the version of the friction damper shown in FIG. 1. Major differences are found in the friction rings with larger inner and outer diameter, denoted by the numeral 21 in FIG. 4.

Figure 6A:
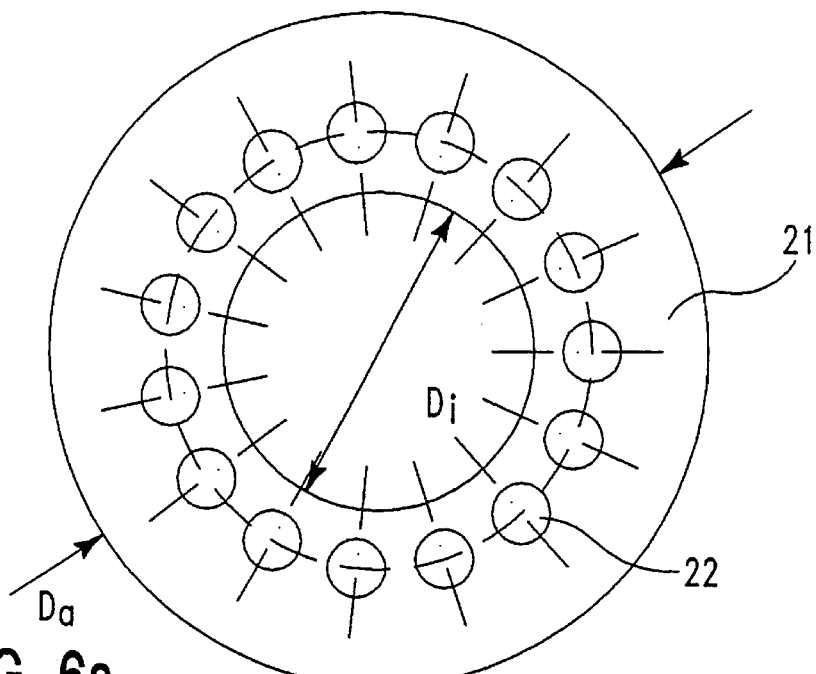
FIG. 6(a) is a plan view of the friction ring of the damper shown in FIG. 4.
Figure 6B:
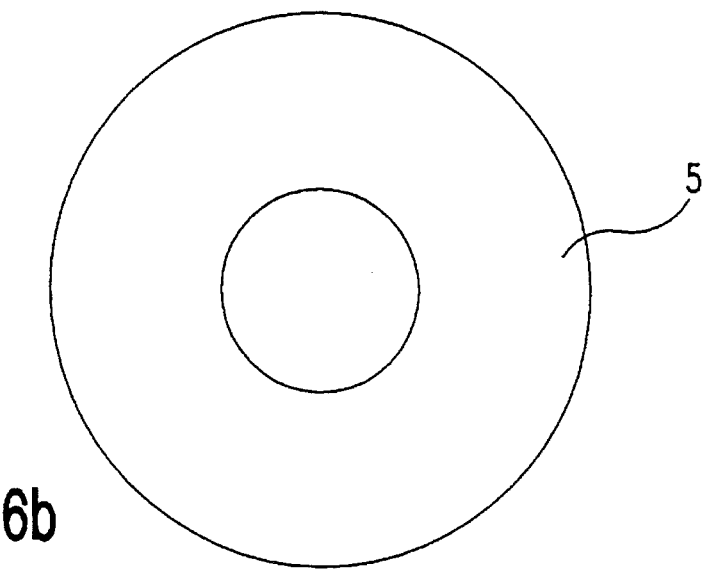
FIG. 6(b) is a plan view of the friction ring of the damper shown in FIG. 5.

A view of the friction ring 21 is given in FIG. 6 and shows 15 ceramic inserts 22 equally distributed over the circumference of the ring.

Figure 3A:
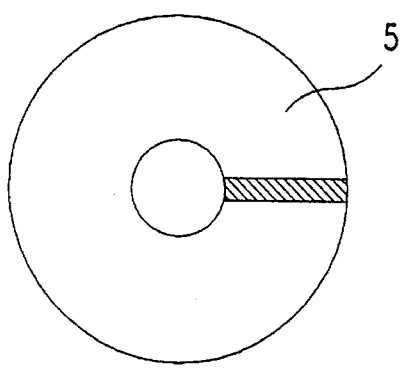
FIG. 3(a) is a plan view of the friction ring of the damper shown in FIG. 1.
Figure 3B:
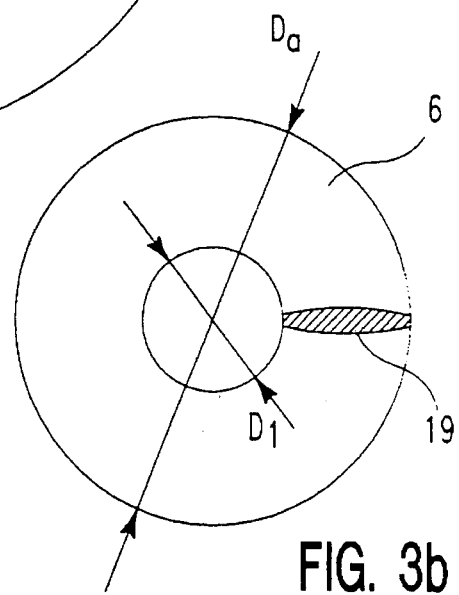
FIG. 3(b) is a plan view of the friction ring of the damper shown in FIG. 2.
Figure 7:
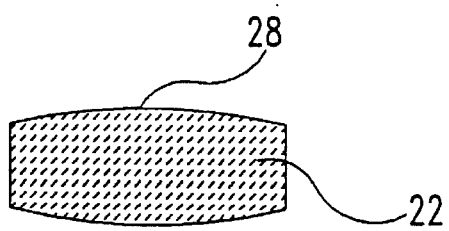
FIG. 7 is a section of an insert for the friction discs shown in FIG. 6.

A section of the ceramic inserts is shown in FIG. 7. These inserts have, similar to the lense-shaped friction rings shown in FIG. 3, a curved surface 28 rising above the plane surface of the friction rings 21 as indicated in FIG. 4.

Different from the friction damper shown in FIG. 1 where a ring-shaped contact area exists between two friction rings touching each other, single contact areas occur around the centers of the ceramic inserts. The higher number of contact surfaces in the solution shown in FIG. 4 evens out the influence of inaccuracies in curvature of the contact areas on the limit force between sticking and sliding.

To be used in friction rings, inserts with a diameter of about 20 mm, a maximum height of about 8 to 10 mm and a radius of curvature of about 220 mm are particularly suitable. A section of such a preferable friction insert is shown in FIG. 7.

The friction damper of FIG. 4 has, like the friction damper of FIG. 1, a tightening bolt 24 acting on a tightening plate 23 that allows the prestressing force in the stack of friction rings to be adjusted with an accuracy of about ±2% with respect to a given value whereas standard friction dampers have an accuracy of only about ±30%.

The friction damper of FIG. 4 has a bellows sealing 25 that protects the stack of friction rings and the prestressing device against environmental influences such as moisture and dirt without inhibiting vertical motions of flanges 26a and 26b.

This sample version also shows that the guide tube denoted 27 in FIG. 4 can also be made in one piece together with the flange 26a.

Shown neither in FIG. 1 nor in FIG. 4 is a protective cover placed on the circular indentation 17 or 28 that additionally improves the sealing of the friction damper against dirt.

In summary, it can be said that with this invention, a friction damper for the protection of buildings against vibrations, especially earthquakes, was created which can be designed to act in two dimensions, can be applied in any angle, ensures a high degree of reliability and maintenance friendliness, does not lose its damping effect when reaching the maximum possible frictional displacement occasionally, is protected against environmental influences and has a tangential friction force precisely adjustable in a wide range.

I claim:

1. A friction damper for the protection of structures against dynamic effects, comprising first and second damping connections which are relatively movable, a stack of at least one first friction disc and at least one second friction disc, said discs having respective first and second contact surfaces which are placed against each other, at least one of said first and second surfaces being curved, said at least one first disc being in contact with said first damping connection, said at least one second disc being in contact with said second damping connection, and prestressing means for loading said first and second discs against each other.

2. A friction damper as in claim 1 wherein said first and second discs each have an inner dimension and an outer dimension, the inner and outer dimension of each said first disc being smaller than the respective inner and outer dimension of each said second disc.

3. A friction damper as in claim 2 wherein said second friction discs have said curved contact surfaces and said first friction discs have planar contact surfaces.

4. A friction damper as in claim 3 wherein said second friction discs have inserts with convex surfaces which form said curved contact surfaces.

5. A friction damper as in claim 4 wherein said inserts are made of ceramic and have a diameter between 10 and 50 min.

6. A friction damper as in claim 2 wherein said first damping connection comprises a guide tube closely recieved through said inner dimension of said first friction discs, and said second damping connection comprises a mantle tube which closely ensleeves said outer dimension of said second friction discs.

7. A friction damper as in claim 6 wherein said first damping connection comprises a flange to which said guide tube is fixed, and said second damping connection comprises a flange to which said mantle tube is fixed.

8. A friction damper as in claim 6 wherein said prestressing means comprises a tightening bolt having a head, a shank extending through said guide tube, and a tightening plate which is drawn toward said first damping connection by said bolt to load said first and second discs against each other.

9. A friction damper as in claim 8 further comprising spring means with a non-linear spring characteristic placed between the head of the tightening bolt and the first damping connection.

10. A friction damper as in claim 6 wherein relative movement of the first and second damping connection is limited by contact between at least one of the inner dimension of the second discs and the guide tube, and the outer dimension of the first discs and the mantle tube.

11. A friction damper as in the claims 4 wherein the inserts are exchangeable for inserts having convex surfaces with a different curvature.

* * * * *